US012587791B2

(12) United States Patent
Ren et al.

(10) Patent No.: US 12,587,791 B2
(45) Date of Patent: Mar. 24, 2026

(54) SOUND-GENERATING DEVICE

(71) Applicant: AAC Microtech (Changzhou) Co., Ltd., Changzhou (CN)

(72) Inventors: Zhang Ren, Changzhou (CN); Zhiwei Zhong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 195 days.

(21) Appl. No.: 18/522,158

(22) Filed: Nov. 28, 2023

(65) Prior Publication Data

US 2025/0126412 A1 Apr. 17, 2025

Related U.S. Application Data

(63) Continuation of application No. PCT/CN2023/124725, filed on Oct. 16, 2023.

(51) Int. Cl.
*H04R 9/02* (2006.01)
*H04R 9/04* (2006.01)
*H04R 9/06* (2006.01)

(52) U.S. Cl.
CPC ............. *H04R 9/027* (2013.01); *H04R 9/045* (2013.01); *H04R 9/06* (2013.01); *H04R 2400/11* (2013.01)

(58) Field of Classification Search
None
See application file for complete search history.

(56) References Cited

U.S. PATENT DOCUMENTS

| | | | | |
|---|---|---|---|---|
| 4,899,390 A * | 2/1990 | Takewa | H04R 7/04 | 381/186 |
| 8,577,075 B2 * | 11/2013 | Yan | H04R 9/063 | 381/409 |
| 8,873,792 B2 * | 10/2014 | Shao | H04R 9/043 | 381/396 |
| 10,979,816 B2 * | 4/2021 | Feng | H04R 7/16 | |
| 11,153,679 B1 * | 10/2021 | Hwang | H04R 29/003 | |
| 2010/0215208 A1 * | 8/2010 | Sadaie | H04R 1/227 | 381/407 |
| 2022/0174412 A1 * | 6/2022 | Zhong | H04R 9/025 | |
| 2024/0251200 A1 * | 7/2024 | Wang | H04R 1/2869 | |
| 2025/0008259 A1 * | 1/2025 | Lin | H04R 1/403 | |

* cited by examiner

*Primary Examiner* — Walter F Briney, III
(74) *Attorney, Agent, or Firm* — Wiersch Law Group

(57) ABSTRACT

A sound-generating device, including a cone frame, a vibration system fixed to the cone frame, and a magnetic circuit system fixed to the cone frame and configured to drive the vibration system to vibrate. The vibration system includes a diaphragm, a first voice coil, a second voice coil and a third voice coil, where the first, second and third voice coils are arranged spaced apart, and are configured to drive the diaphragm to vibrate. The diaphragm includes a first surround, a second surround and a vibration portion. The magnetic circuit system is provided with a first magnetic gap, a second magnetic gap and a third magnetic gap spaced apart. The first voice coil is insertedly suspended in the first magnetic gap. The second voice coil is insertedly suspended in the second magnetic gap. The third voice coil is insertedly suspended in the third magnetic gap.

8 Claims, 4 Drawing Sheets

A–A

A-A

A--A

SOUND-GENERATING DEVICE

CROSS-REFERENCE TO RELATED APPLICATIONS

This application is a continuation of International Patent Application No. PCT/CN2023/124725, filed on Oct. 16, 2023. The content of the aforementioned application, including any intervening amendments made thereto, is incorporated herein by reference in its entirety.

TECHNICAL FIELD

The present application relates to electro-acoustic conversion, and more particularly to a sound-generating device.

BACKGROUND

Sound-generating device is a transducing device that converts an electrical signal into an acoustic signal, which mainly includes a cone frame, a vibration system fixed to the cone frame, and a magnetic circuit system fixed to the cone frame and configured to drive the vibration system to vibrate. The vibration system includes a diaphragm and a voice coil that drives the vibration of the diaphragm. The diaphragm includes a surround fixed to the cone frame and in a ring shape, a vibration portion fixed to the surround, and a dome fixed to a side of the vibration portion away from the magnetic circuit system. The magnetic circuit system mainly includes a bottom plate and a magnet fixed to the bottom plate. In order to arrive at an enhanced acoustic performance, a large-size full-range coaxial sound-generating device has been designed.

In most of the existing large-size full-range coaxial sound-generating devices, a single voice coil is fixed to the side of the vibration portion near the magnetic circuit system, which will lead to an excessive support area of the dome. In the case of insufficient actual stiffness and strength, the diaphragm is prone to split vibration, which will seriously affect the acoustic performance of the large-size full-range coaxial sound-generating device.

Therefore, it is necessary to provide a novel sound-generating device to solve the above technical problems.

SUMMARY

An object of the present application is to provide a sound-generating device to overcome the technical problem in the existing large-size full-range coaxial sound-generating devices that the single voice coil will easily cause the split vibration of the diaphragm.

Technical solutions of this application will be specifically described below.

This application provides a sound-generating device, comprising:

a cone frame;

a vibration system fixed to the cone frame; and a magnetic circuit system fixed to the cone frame and configured to drive the vibration system to vibrate;

wherein the vibration system comprises a diaphragm, a first voice coil, a second voice coil and a third voice coil; the first voice coil, the second voice coil and the third voice coil are arranged spaced apart from each other, and are configured to drive the diaphragm to vibrate; the diaphragm comprises a first surround in a ring shape, a second surround arranged spaced apart at an inner side of the first surround, and a vibration portion in a ring shape; an outer periphery of the first surround is fixed to the cone frame; an inner periphery of the first surround is fixed to an outer periphery of the vibration portion; a periphery of the second surround near the first surround is fixed to an inner periphery of the vibration portion; the first voice coil, the second voice coil and the third voice coil are connected in series, and are fixed to a side of the vibration portion near the magnetic circuit system; and a side of the magnetic circuit system near the vibration system is provided with a first magnetic gap, a second magnetic gap and a third magnetic gap spaced apart from each other; the first magnetic gap and the third magnetic gap are respectively located at opposite sides of the second magnetic gap; the first voice coil is configured to be insertedly suspended in the first magnetic gap; the second voice coil is configured to be insertedly suspended in the second magnetic gap; and the third voice coil is configured to be insertedly suspended in the third magnetic gap.

In some embodiments, the diaphragm is rectangular; the vibration system further comprises two domes fixedly attached to a side of the vibration portion away from the magnetic circuit system; and the two domes are located at opposite sides of the second surround, respectively.

In some embodiments, the second surround comprises a surrounding portion in a ring shape, a surrounding wall and a top plate covered on a top of the surrounding wall; the surrounding wall has a ring shape, and is configured to bend and extend from an inner periphery of the surrounding portion toward a side away from the magnetic circuit system; and an outer periphery of the surrounding portion is fixed to the inner periphery of the vibration portion.

In some embodiments, the vibration system further comprises an elastic member in a rectangular shape; the elastic member comprises a supporting portion, a connecting portion spaced apart from the supporting portion and four elastic portions; the supporting portion is fixed to the cone frame, and has a ring shape; the four elastic portions are configured to respectively bend and extend from four corners of the supporting portion to be connected to the connecting portion; the connecting portion is fixed to the vibration portion; and the first voice coil, the second voice coil and the third voice coil are fixed to a side of the connecting portion away from the vibration portion.

In some embodiments, the number of the connecting portion is two, and each of two connecting portions has a square double loop shape; two adjacent elastic portions in each group are respectively connected to adjacent two corners of one of the two connecting portions; the first voice coil is fixed to a rectangular part of one of the two connecting portions near two elastic portions connected thereto; the second voice coil is fixed to edge parts of the two connecting portions close to each other; and the third voice coil is fixed to a rectangular part of the other of the two connecting portions near the other two elastic portions connected thereto.

In some embodiments, the magnetic circuit system comprises a bottom plate, a first primary magnet, a second primary magnet, a third primary magnet, a plurality of first secondary magnets, a plurality of second secondary magnets and a plurality of third secondary magnets; the first primary magnet, the second primary magnet and the third primary magnet are stacked in sequence and fixed to a side of the bottom plate close to the vibration system, and are arranged spaced apart from each other; the plurality of first secondary magnets are stacked and fixed to the bottom plate, and are arranged around the first primary magnet; the plurality of second secondary magnets are stacked and fixed to the bottom plate, and are arranged around the second primary magnet; and the plurality of third secondary magnets are stacked and fixed to the bottom plate, and are arranged around the third primary magnet; and the plurality of first secondary magnets are each spaced from the first primary magnet to form the first magnetic gap; the plurality of second secondary magnets, one of the plurality of first secondary magnets close to the second primary magnet and one of the plurality of third secondary magnets close to the second primary magnet are each spaced from the second primary magnet to form the second magnetic gap; and the plurality of third secondary magnets are each spaced from the third primary magnet to form the third magnetic gap.

In some embodiments, the magnetic circuit system further comprises a first center magnet stackedly fixed to a side of the second primary magnet close to the vibration system, and a second center magnet stackedly fixed to a side of the first center magnet close to the vibration system; and the second surround is also fixed to a side of the first center magnet away from the second primary magnet.

In some embodiments, the magnetic circuit system further comprises a first pole core stackedly fixed to a side of the first primary magnet close to the vibration system, a second pole core stackedly fixed to a side of the second primary magnet close to the vibration system, and a third pole core stackedly fixed to a side of the third primary magnet close to the vibration system; and the second pole core is located between the second primary magnet and the first center magnet.

In some embodiments, the first primary magnet, the second primary magnet, the third primary magnet, the plurality of first secondary magnets, the plurality of second secondary magnets, the plurality of third secondary magnets, the first center magnet and the second center magnet each have a magnetization direction situated along a vibration direction of the diaphragm; the first primary magnet, the second primary magnet and the third primary magnet have the same magnetization direction; and magnetization directions of the plurality of first secondary magnets, the plurality of second secondary magnets, the plurality of third secondary magnets, the first center magnet and the second center magnet are all opposite to a magnetization direction of the first primary magnet.

In some embodiments, the number of the plurality of first secondary magnets is four, and four first secondary magnets are provided around four sides of the first primary magnet; the number of the plurality of second secondary magnets is two, and two second secondary magnets are provided around two sides of the second primary magnet that are not close to the first primary magnet and the third primary magnet; the number of the plurality of third secondary magnets is four, and four third secondary magnets are provided around four sides of the third primary magnet; and the magnetic circuit system further comprises a first top plate in a ring shape, a second top plate in a flat shape and a third top plate; the first top plate is stackedly fixed to three of the four first secondary magnets that are not close to the second primary magnet, the two second secondary magnets, and three of the four third secondary magnets that are not close to the second primary magnet; the first top plate is also fixed to the cone frame; the first top plate is located at a side of the four first secondary magnets close to the vibration system, a side of the two second secondary magnets close to the vibration system and a side of the four third secondary magnets close to the vibration system; the second top plate is stackedly fixed to one of the four first secondary magnets close to the second primary magnet; the second top plate is located at the side of four first secondary magnets close to the vibration system; the third top plate is stackedly fixed to one of the four third secondary magnets close to the second primary magnet; and the third top plate is located at the side of the four third secondary magnets close to the vibration system.

Compared to the prior art, this application has the following beneficial effects.

Regarding the sound-generating device provided herein, three voice coils connected in series are arranged at the diaphragm, which can prevent the support area of the dome from being excessive and make the dome have sufficient rigidity and strength, thereby preventing the diaphragm from suffering split vibration and greatly improving the acoustic performance of the sound-generating device.

BRIEF DESCRIPTION OF THE DRAWINGS

In order to illustrate the technical solutions in the embodiments of the present application more clearly, the drawings needed in the description of embodiments of the present application will be briefly described below. Obviously, presented in the drawings are merely some embodiments of this application, which are not intended to limit this application. For those skilled in the art, other drawings can be obtained based on the drawings provided herein without making creative effort.

Figure 1:
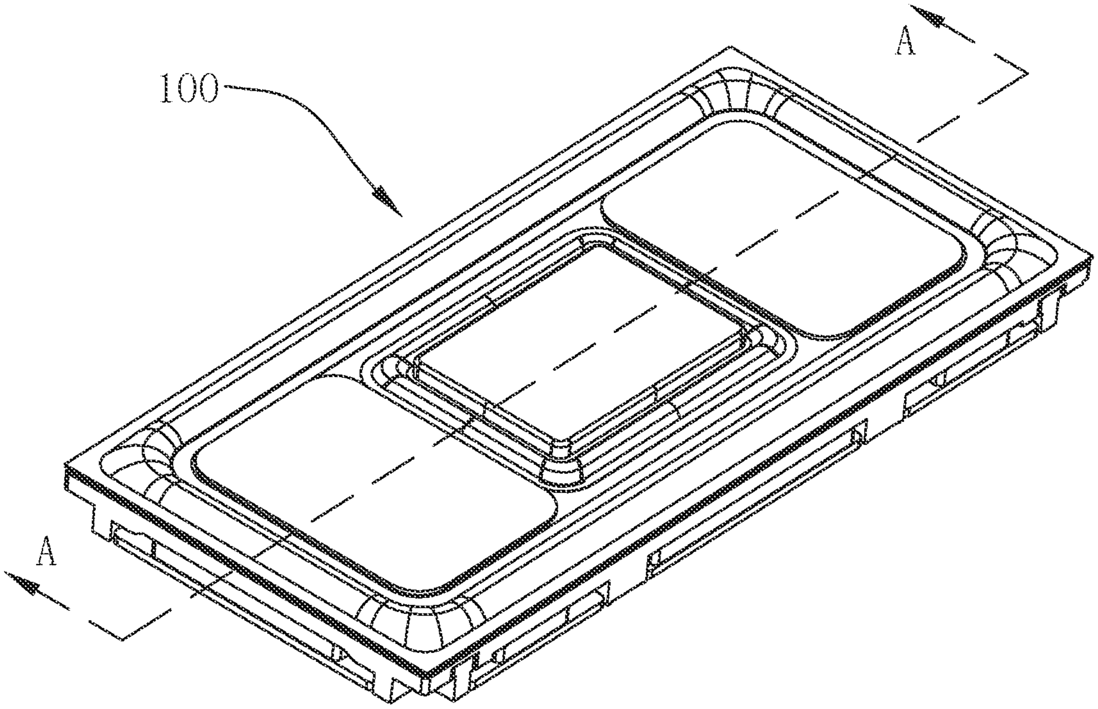
FIG. 1 is a perspective view of a sound-generating device according to an embodiment of the present disclosure.
Figure 2:
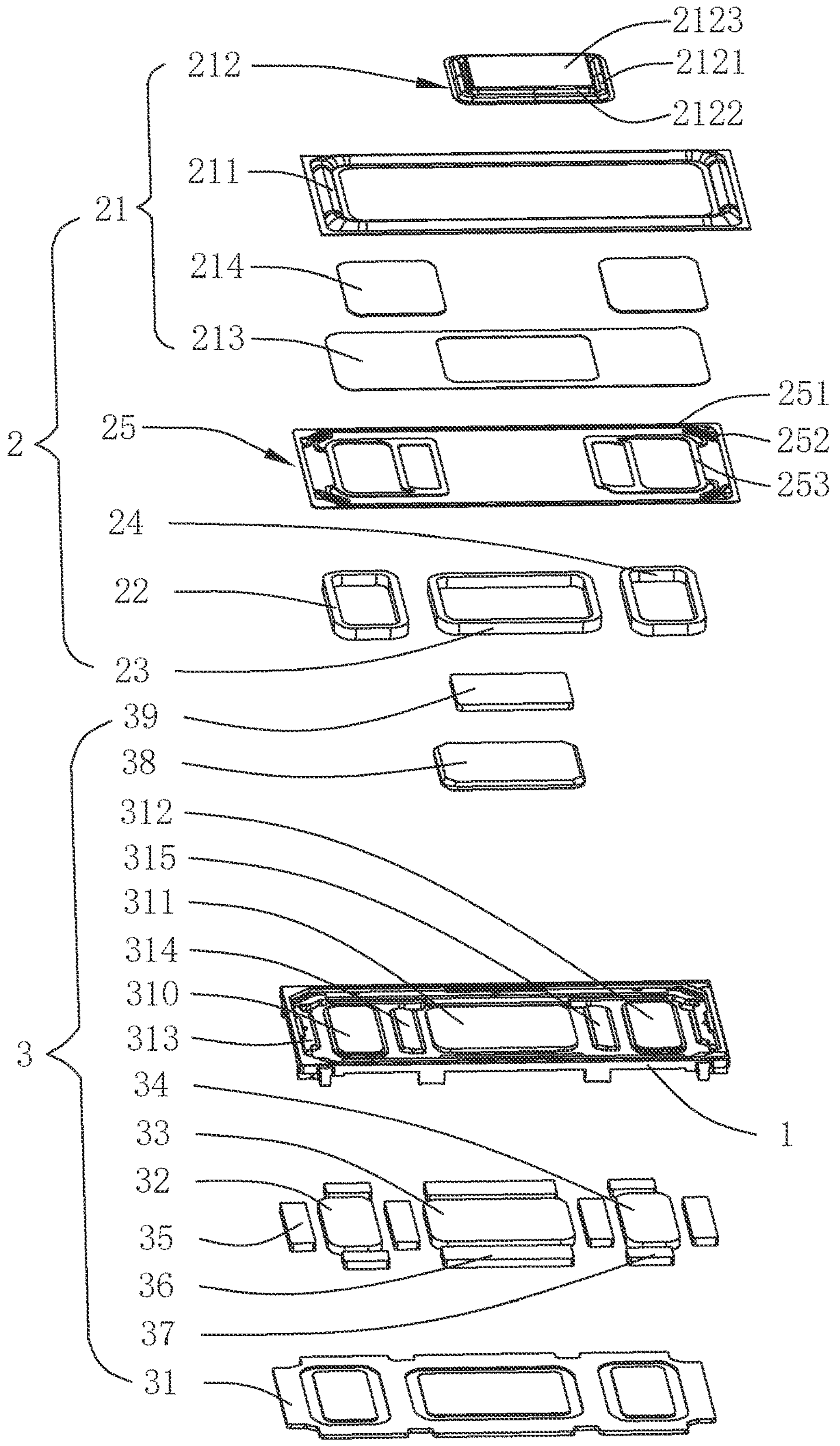
FIG. 2 is an exploded view of the sound-generating device according to an embodiment of the present disclosure.
Figure 3:
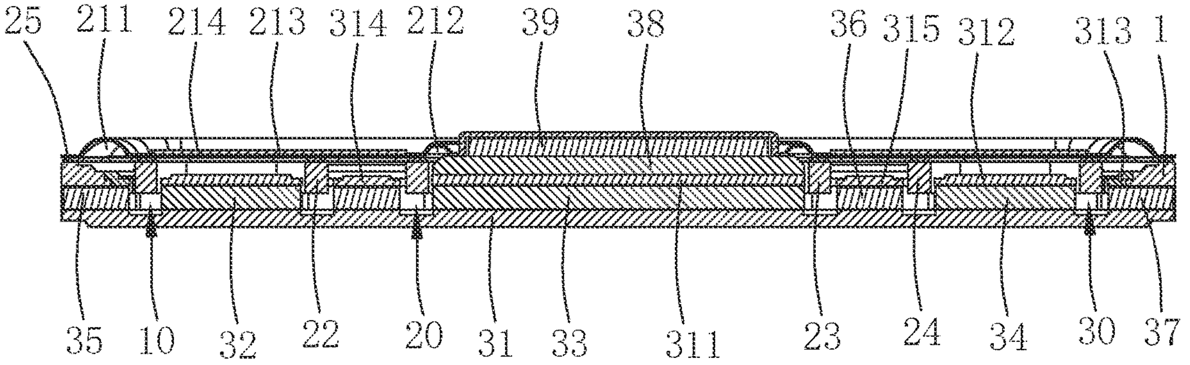
FIG. 3 is a sectional view of the sound-generating device in FIG. 1 along A-A line.

In the drawings: 100, sound-generating device; 1, cone frame; 2, vibration system; 21, diaphragm; 211, first surround; 212, second surround; 2121, surrounding portion; 2122, surrounding wall; 2123, top plate; 213, vibration portion; 214, dome; 22, first voice coil; 23, second voice coil; 24, third voice coil; 25, elastic member; 251, supporting portion; 252, elastic portion; 253, connecting portion; 3, magnetic circuit system; 31, bottom plate; 32, first primary magnet; 33, second primary magnet; 34, third primary magnet; 35, first secondary magnet; 36, second secondary magnet; 37, third secondary magnet; 38, first center magnet; 39, second center magnet; 310, first pole core; 311, second pole core; 312, third pole core; 313, first top plate; 314, second top plate; 315, third top plate; 10, first magnetic gap; 20, second magnetic gap; and 30, third magnetic gap.

DETAILED DESCRIPTION OF THE EMBODIMENTS

Unless otherwise defined, all technical and scientific terms used herein have the same meanings as those are commonly understood by those skilled in the art to which this application belongs. The terms used herein are used only for the purpose of describing specific embodiments and are not intended to limit the application. The terms "comprising" and "having" and any variations thereof in the specification and claims of this application and in the foregoing description of the accompanying drawings are intended to cover non-exclusive inclusion. The terms "first", "second", etc., in the specification and claims of this application or in the description of drawings are used to distinguish between different objects and are not intended to indicate a particular order.

The reference to "embodiment(s)" herein indicates that particular features, structures, or characteristics described in conjunction with embodiments may be included in at least one embodiment of the present application. The presence of the phrase in the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

It should be noted that the orientation and position relationship described with reference to terms "upper", "lower", "left", "right" and the like is based on the orientation and position relationship shown in the drawings, and thus these terms should not be construed as limitation to the disclosure. It should also be understood that, as used herein, the term "above" or "below" indicates that an element is directly "above" or "below" another element, or "above" or "below" another element through an intermediate element.

The present application will be described clearly and completely below with reference to the accompanying drawings and embodiments to make objects, technical solutions, and advantages of the present application clearer and better understood. It should be understood that described below are merely some embodiments of the present application, and are not intended to limit the present application. Other embodiments obtained by those skilled in the art based on the content disclosed herein without making creative effort should fall within the scope of the present application.

Referring to an embodiment in FIGS. 1-4, a sound-generating device 100 is provided, which includes a cone frame 1, a vibration system 2 fixed to the cone frame 1, and a magnetic circuit system 3 fixed to the cone frame 1 and configured to drive the vibration system 2 to vibrate.

The vibration system 2 includes a diaphragm 21, a first voice coil 22, a second voice coil 23 and a third voice coil 24, where the first voice coil 22, the second voice coil 23 and the third voice coil 24 are arranged spaced apart from each other, and are configured to drive the diaphragm 21 to vibrate. The diaphragm 21 includes a first surround 211 in a ring shape, a second surround 212 arranged spaced apart at an inner side of the first surround 211, and a vibration portion 213 in a ring shape. An outer periphery of the first surround 211 is fixed to the cone frame 1, and an inner periphery of the first surround 211 is fixed to an outer periphery of the vibration portion 213. A periphery of the second surround 212 near the first surround 211 is fixed to an inner periphery of the vibration portion 213. The first voice coil 22, the second voice coil 23 and the third voice coil 24 are connected in series, and are fixed to a side of the vibration portion 213 near the magnetic circuit system 3.

A side of the magnetic circuit system 3 near the vibration system 2 is provided with a first magnetic gap 10, a second magnetic gap 20 and a third magnetic gap 30 spaced apart from each other. The first magnetic gap 10 and the third magnetic gap 30 are respectively located at opposite sides of the second magnetic gap 20. The first voice coil 22 is configured to be insertedly suspended in the first magnetic gap 10. The second voice coil 23 is configured to be insertedly suspended in the second magnetic gap 20. The third voice coil 24 is configured to be insertedly suspended in the third magnetic gap 30.

In this embodiment, the second surround 212 includes a surrounding portion 2121 in a ring shape, a surrounding wall 2122 and a top plate 2123 covered on a top of the surrounding wall 2122. The surrounding wall 2122 has a ring shape, and is configured to bend and extend from an inner periphery of the surrounding portion 2121 toward a side away from the magnetic circuit system 3. An outer periphery of the surrounding portion 2121 is fixed to the inner periphery of the vibration portion 213.

Specifically, the vibration system 2 further includes a dome 214 attached and fixed to a side of the vibration portion 213 away from the magnetic circuit system 3.

In this embodiment, the diaphragm 21 is rectangular, and two domes are located at opposite sides of the second surround 212, respectively.

Specifically, the vibration system 2 further includes an elastic member 25 in a rectangular shape. The elastic member 25 includes a supporting portion 251, a connecting portion 253 spaced apart from the supporting portion 251 and four elastic portions 252. The supporting portion 251 is fixed to the cone frame 1, and has a ring shape. The four elastic portions 252 are configured to respectively bend and extend from four corners of the supporting portion 251 to be connected to the connecting portion 253. The connecting portion 253 is fixed to the vibration portion 213. The first voice coil 22, the second voice coil 23 and the third voice coil 24 are fixed to a side of the connecting portion 253 away from the vibration portion 213.

In this embodiment, the number of the connecting portion 253 is two, and each of two connecting portions 253 has a square double loop shape. Two adjacent elastic portions 252 in each group are respectively connected to adjacent two corners of one of the two connecting portions 253. The first voice coil 22 is fixed to a rectangular part of one of the two connecting portions 253 near two elastic portions 252 connected thereto. The second voice coil 23 is fixed to edge parts of the two connecting portions 253 close to each other, and the third voice coil 24 is fixed to a rectangular part of the other of the two connecting portions 253 near the other two elastic portions 252 connected thereto.

Specifically, the magnetic circuit system 3 includes a bottom plate 31, a first primary magnet 32, a second primary magnet 33, a third primary magnet 34, a plurality of first secondary magnets 35, a plurality of second secondary magnets 36 and a plurality of third secondary magnets 37. The first primary magnet 32, the second primary magnet 33 and the third primary magnet 34 are stacked in sequence and fixed to a side of the bottom plate 31 close to the vibration system 2, and are arranged spaced apart from each other. The plurality of first secondary magnets 35 are stacked and fixed to the bottom plate 31, and are arranged around the first primary magnet 32. The plurality of second secondary magnets 36 are stacked and fixed to the bottom plate 31, and are arranged around the second primary magnet 33. The plurality of third secondary magnets 37 are stacked and fixed to the bottom plate 31, and are arranged around the third primary magnet 34. The plurality of first secondary magnets 35 are each spaced from the first primary magnet 32 to form the first magnetic gap 10. The plurality of second secondary magnets 36, one of the plurality of first secondary magnets 35 close to the second primary magnet 33 and one of the plurality of third secondary magnets 37 close to the second primary magnet 33 are each spaced from the second primary magnet 33 to form the second magnetic gap 20. The plurality of third secondary magnets 37 are each spaced from the third primary magnet 34 to form the third magnetic gap 30.

In this embodiment, the magnetic circuit system 3 has a rectangular shape. The number of the plurality of first secondary magnets 35 is four, and four first secondary magnets 35 are provided around four sides of the first primary magnet 32. The number of the plurality of second secondary magnets 36 is two, and two second secondary magnets 36 are provided around two sides of the second primary magnet 33 that are not close to the first primary magnet 32 and the third primary magnet 34. The two second secondary magnets 36, one of the four first secondary magnets 35 close to the second primary magnet 33 and one of the plurality of third secondary magnets 37 close to the second primary magnet 33 are each spaced from the second primary magnet 33 to form the second magnetic gap 20. The number of the plurality of third secondary magnets 37 is four, and four third secondary magnets 37 are provided around four sides of the third primary magnet 34.

Specifically, the magnetic circuit system 3 further includes a first center magnet 38 stackedly fixed to a side of the second primary magnet 33 close to the vibration system 2, and a second center magnet 39 stackedly fixed to a side of the first center magnet 38 close to the vibration system 2. The second surround 212 is also fixed to a side of the first center magnet 38 away from the second primary magnet 33. This design can effectively utilize the space of the sound-generating device 100, and the first center magnet 38 and the second center magnet 39 can increase the overall BL value, thereby avoiding the waste of space inside the sound-generating device 100.

The second surround 212 is fixed to a side of the first center magnet 38 away from the second primary magnet 33 through an inner periphery of its surrounding portion 2121.

Figure 4:
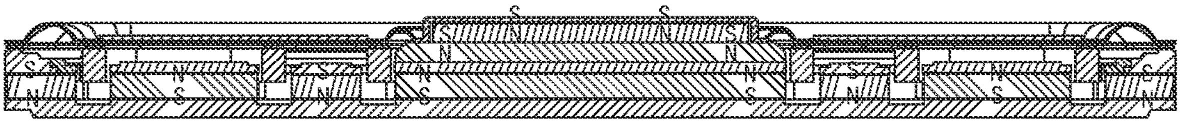
FIG. 4 schematically shows polarity distribution of individual magnets in the sound-generating device after sectioned along the A-A line in FIG. 1.

In this embodiment, the first primary magnet 32, the second primary magnet 33, the third primary magnet 34, the plurality of first secondary magnets 35, the plurality of second secondary magnets 36, the plurality of third secondary magnets 37, the first center magnet 38 and the second center magnet 39 each have a magnetization direction situated along a vibration direction of the diaphragm 21. The first primary magnet 32, the second primary magnet 33 and the third primary magnet 34 have the same magnetization direction, and magnetization directions of the plurality of first secondary magnets 35, the plurality of second secondary magnets 36, the plurality of third secondary magnets 37, the first center magnet 38 and the second center magnet 39 are all opposite to a magnetization direction of the first primary magnet 32. In FIG. 4, "N" and "S" respectively represent N pole and S pole of individual magnets.

Specifically, the magnetic circuit system 3 further includes a first pole core 310 stackedly fixed to a side of the first primary magnet 32 close to the vibration system 2, a second pole core 311 stackedly fixed to a side of the second primary magnet 33 close to the vibration system 2, and a third pole core 312 stackedly fixed to a side of the third primary magnet 34 close to the vibration system 2. The second pole core 311 is located between the second primary magnet 33 and the first center magnet 38.

Specifically, the magnetic circuit system further includes a first top plate 313 in a ring shape, a second top plate 314 in a flat shape and a third top plate 315. The first top plate 313 is stackedly fixed to three of the four first secondary magnets 35 that are not close to the second primary magnet 33, the two second secondary magnets 36, and three of the four third secondary magnets 37 that are not close to the second primary magnet 33. The first top plate 313 is also fixed to the cone frame 1. The first top plate 313 is located at a side of the four first secondary magnets 35 close to the vibration system 2, a side of the two second secondary magnets 36 close to the vibration system 2 and a side of the four third secondary magnets 37 close to the vibration system 2. The second top plate 314 is stackedly fixed to one of the four first secondary magnets 35 close to the second primary magnet 33. The second top plate 314 is located at the side of four first secondary magnets 35 close to the vibration system 2. The third top plate 315 is stackedly fixed to one of the four third secondary magnets 37 close to the second primary magnet 33, and the third top plate 315 is located at the side of the four third secondary magnets 37 close to the vibration system 2.

Regarding the sound-generating device 100 provided herein, three voice coils connected in series and multiple domes 214 are arranged at the diaphragm 21, which can prevent the support area of the domes 214 from being excessive and make the domes 214 have sufficient rigidity and strength, thereby preventing the diaphragm 21 from suffering split vibration and greatly improving the acoustic performance of the sound-generating device 100.

The foregoing description of the disclosed embodiments enables those of ordinary skill in the art to implement or use the technical solutions of this application, and is not intended to limit the present application. It should be understood that any variations, replacements and modifications made by those of ordinary skill in the art without departing from the spirit and scope of the present application shall fall within the scope of the present application defined by the appended claims. Unless otherwise defined, words appearing in the singular form include the plural form and vice versa. Also, unless specifically stated, all or part of any embodiment may be used in conjunction with all or part of any other embodiment.

What is claimed is:

1. A sound-generating device, comprising:

a cone frame;

a vibration system fixed to the cone frame; and a magnetic circuit system fixed to the cone frame and configured to drive the vibration system to vibrate;

wherein the vibration system comprises a diaphragm, a first voice coil, a second voice coil and a third voice coil; the first voice coil, the second voice coil and the third voice coil are arranged spaced apart from each other, and are configured to drive the diaphragm to vibrate; the diaphragm comprises a first surround in a ring shape, a second surround arranged spaced apart at an inner side of the first surround, and a vibration portion in a ring shape; an outer periphery of the first surround is fixed to the cone frame; an inner periphery of the first surround is fixed to an outer periphery of the vibration portion; a periphery of the second surround near the first surround is fixed to an inner periphery of the vibration portion; the first voice coil, the second voice coil and the third voice coil are connected in series, and are fixed to a side of the vibration portion near the magnetic circuit system; and a side of the magnetic circuit system near the vibration system is provided with a first magnetic gap, a second magnetic gap and a third magnetic gap spaced apart from each other; the first magnetic gap and the third magnetic gap are respectively located at opposite sides of the second magnetic gap; the first voice coil is configured to be insertedly suspended in the first magnetic gap; the second voice coil is configured to be insertedly suspended in the second magnetic gap; and the third voice coil is configured to be insertedly suspended in the third magnetic gap;

the magnetic circuit system comprises a bottom plate, a first primary magnet, a second primary magnet, a third primary magnet, a plurality of first secondary magnets, a plurality of second secondary magnets and a plurality of third secondary magnets; the first primary magnet, the second primary magnet and the third primary magnet are stacked in sequence and fixed to a side of the bottom plate close to the vibration system, and are arranged spaced apart from each other; the plurality of first secondary magnets are stacked and fixed to the bottom plate, and are arranged around the first primary magnet; the plurality of second secondary magnets are stacked and fixed to the bottom plate, and are arranged around the second primary magnet; and the plurality of third secondary magnets are stacked and fixed to the bottom plate, and are arranged around the third primary magnet; and the plurality of first secondary magnets are each spaced from the first primary magnet to form the first magnetic gap; the plurality of second secondary magnets, one of the plurality of first secondary magnets close to the second primary magnet and one of the plurality of third secondary magnets close to the second primary magnet are each spaced from the second primary magnet to form the second magnetic gap; and the plurality of third secondary magnets are each spaced from the third primary magnet to form the third magnetic gap;

the magnetic circuit system further comprises a first center magnet stackedly fixed to a side of the second primary magnet close to the vibration system, and a second center magnet stackedly fixed to a side of the first center magnet close to the vibration system; and the second surround is also fixed to a side of the first center magnet away from the second primary magnet.

2. The sound-generating device of claim 1, wherein the diaphragm is rectangular; the vibration system further comprises two domes fixedly attached to a side of the vibration portion away from the magnetic circuit system; and the two domes are located at opposite sides of the second surround, respectively.

3. The sound-generating device of claim 1, wherein the second surround comprises a surrounding portion in a ring shape, a surrounding wall and a top plate covered on a top of the surrounding wall; the surrounding wall has a ring shape, and is configured to bend and extend from an inner periphery of the surrounding portion toward a side away from the magnetic circuit system; and an outer periphery of the surrounding portion is fixed to the inner periphery of the vibration portion.

4. The sound-generating device of claim 1, wherein the vibration system further comprises an elastic member in a rectangular shape; the elastic member comprises a supporting portion, a connecting portion spaced apart from the supporting portion and four elastic portions; the supporting portion is fixed to the cone frame, and has a ring shape; the four elastic portions are configured to respectively bend and extend from four corners of the supporting portion to be connected to the connecting portion; the connecting portion is fixed to the vibration portion; and the first voice coil, the second voice coil and the third voice coil are fixed to a side of the connecting portion away from the vibration portion.

5. The sound-generating device of claim 4, wherein the number of the connecting portion is two, and each of two connecting portions has a square double loop shape; two adjacent elastic portions in each group are respectively connected to adjacent two corners of one of the two connecting portions; the first voice coil is fixed to a rectangular part of one of the two connecting portions near two elastic portions connected thereto; the second voice coil is fixed to edge parts of the two connecting portions close to each other; and the third voice coil is fixed to a rectangular part of the other of the two connecting portions near the other two elastic portions connected thereto.

6. The sound-generating device of claim 1, wherein the magnetic circuit system further comprises a first pole core stackedly fixed to a side of the first primary magnet close to the vibration system, a second pole core stackedly fixed to a side of the second primary magnet close to the vibration system, and a third pole core stackedly fixed to a side of the third primary magnet close to the vibration system; and the second pole core is located between the second primary magnet and the first center magnet.

7. The sound-generating device of claim 1, wherein the first primary magnet, the second primary magnet, the third primary magnet, the plurality of first secondary magnets, the plurality of second secondary magnets, the plurality of third secondary magnets, the first center magnet and the second center magnet each have a magnetization direction situated along a vibration direction of the diaphragm; the first primary magnet, the second primary magnet and the third primary magnet have the same magnetization direction; and magnetization directions of the plurality of first secondary magnets, the plurality of second secondary magnets, the plurality of third secondary magnets, the first center magnet and the second center magnet are all opposite to a magnetization direction of the first primary magnet.

8. The sound-generating device of claim 1, wherein the number of the plurality of first secondary magnets is four, and four first secondary magnets are provided around four sides of the first primary magnet; the number of the plurality of second secondary magnets is two, and two second secondary magnets are provided around two sides of the second primary magnet that are not close to the first primary magnet and the third primary magnet; the number of the plurality of third secondary magnets is four, and four third secondary magnets are provided around four sides of the third primary magnet; and the magnetic circuit system further comprises a first top plate in a ring shape, a second top plate in a flat shape and a third top plate; the first top plate is stackedly fixed to three of the four first secondary magnets that are not close to the second primary magnet, the two second secondary magnets, and three of the four third secondary magnets that are not close to the second primary magnet; the first top plate is also fixed to the cone frame; the first top plate is located at a side of the four first secondary magnets close to the vibration system, a side of the two second secondary magnets close to the vibration system and a side of the four third secondary magnets close to the vibration system; the second top plate is stackedly fixed to one of the four first secondary magnets close to the second primary magnet; the second top plate is located at the side of four first secondary magnets close to the vibration system; the third top plate is stackedly fixed to one of the four third secondary magnets close to the second primary magnet; and the third top plate is located at the side of the four third secondary magnets close to the vibration system.

* * * * *